L. A. LAURSEN.
FLUID OPERATED GEAR SHIFTING MECHANISM.
APPLICATION FILED DEC. 15, 1917.

1,329,779.

Patented Feb. 3, 1920.
6 SHEETS—SHEET 5.

Witness
E.H.Wagner.

Inventor
L.A.Laursen
By Robert Robb
Attorneys

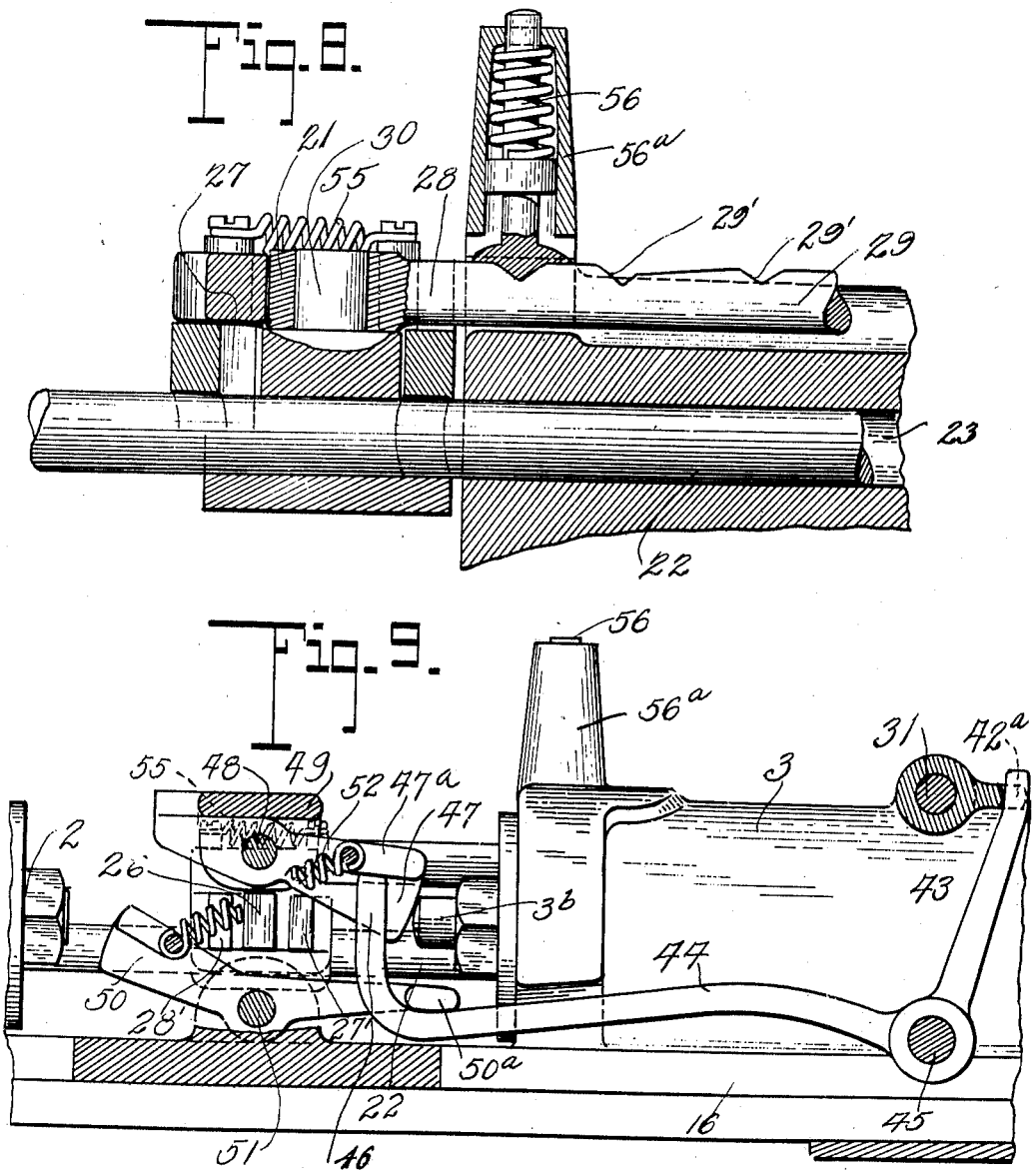

UNITED STATES PATENT OFFICE.

LAURITS A. LAURSEN, OF EAU CLAIRE, WISCONSIN.

FLUID-OPERATED GEAR-SHIFTING MECHANISM.

1,329,779.  Specification of Letters Patent.  Patented Feb. 3, 1920.

Application filed December 15, 1917. Serial No. 207,279.

*To all whom it may concern:*

Be it known that I, LAURITS A. LAURSEN, a citizen of the United States, residing at Eau Claire, in the county of Eau Claire and State of Wisconsin, have invented certain new and useful Improvements in Fluid-Operated Gear-Shifting Mechanism, of which the following is a specification.

This invention embodies a carrying forward of the invention of my co-pending application Number 149,707 filed February 19, 1917, and therefore has a direct relation to the art of variable speed transmission gearings wherein the changes in the gear relations are susceptible of being effected by means of pressure operated controlling and operating devices.

An important phase of the improvements hereof resides in the provision of control devices affording a greater range of flexibility of control in respect to the changing of the gear relations of variable speed transmission mechanisms. In my previous invention of the application above identified certain limitations of action exist. These are due primarily to the inability of an operator to cause shifting of the transmission gears from certain gear relations to others. For instance, with the invention of my said application it is impracticable to cause at a single operation a shifting of the gears involving a gear disengaging movement of the shifting device in one direction, and a return gear engaging movement of said shifting device in an opposite direction. For example the peculiar movement of the shifting device as just stated happens to be required to pass from low speed direct to high speed requiring according to the gear mechanism in my previous invention two separate adjustments of the controller—one to carry the shifting device first to neutral and a second adjustment to shift from neutral to high. The foregoing merely exemplifies this particular phase of action because other movements of the shifting device are required in my former transmission and many others, to make direct shifts from and to other gear relations than those just mentioned.

With the improvements of this invention I am able upon a single adjustment of the controller to cause my novel mechanism to perform the peculiar shifting of gear relations such as I have just set forth. For this purpose I have devised a peculiar, automatically operating trip mechanism adapted to coöperate between the actuator for the gear shifter and certain operating devices for this actuator which operating devices comprise pistons operable by a suitable pressure medium.

Still another important feature of the present improvements involves a new arrangement of motor cylinder and piston representing a simplification of my previous construction, together with a redesigning of the selector valve by which the pressure medium is supplied to various cylinders coöperative with the actuator and shifting rod. By these changes I have eliminated the necessity of employing a special selection action for operating one or both of a plurality of motor pistons, a principle used in my previous construction but now dispensed with, with much resultant advantage.

Additional features of my present invention comprise the provision of peculiar locking means for the controller by which the gear relation changing action of the shifting device is predetermined, said means performing a separate function as an indexing device for facilitating a proper setting of the control parts at the time of assembling; an improved operating mechanism controlling the lateral movement of the shifting device, and really forming a part of the automatic trip mechanism previously referred to; and a number of other details of construction appertaining to the reorganization of the general mechanism of the invention, and all of which features are conducive to the practicalization of a fluid or hydraulic gear shifting mechanism for use in connection with the general run of motor vehicles of the many various types at present in common use, and which features will be more fully presented in the accompanying description in connection with the annexed drawings, in which—

Fig. 6 is a detail top plan view of the main actuator for the shifting rod, dotted lines showing the inner actuating arm thereof displaced as when the mechanism has been operated for adjustment of the transmission devices to obtain reverse speed gear relations;

Fig. 7 is a side view of the same;

Fig. 8 is a section taken about on the line 8—8 of Fig. 2;

Fig. 9 is an enlarged side elevation bringing out more clearly the automatic trip and piston rod locking devices associated with the main actuator;

Fig. 10 is a sectional view taken about on the line 10—10 of Fig. 4.

While an understanding of the improvements of this invention will be had in connection with the detailed description hereinafter and the accompanying drawings, I do not wish to be limited to any applicability of my invention restricting it for the purposes of controlling changes of gear relations in transmission gearings. The invention has general selective control mechanism and associated operating devices adapted to be employed for establishing changes in the position of a control member other than a gear shifting rod and therefore the principle of operation as well as construction is susceptible of being availed of for purposes other than in connection with variable speed transmissions.

Figure 1:
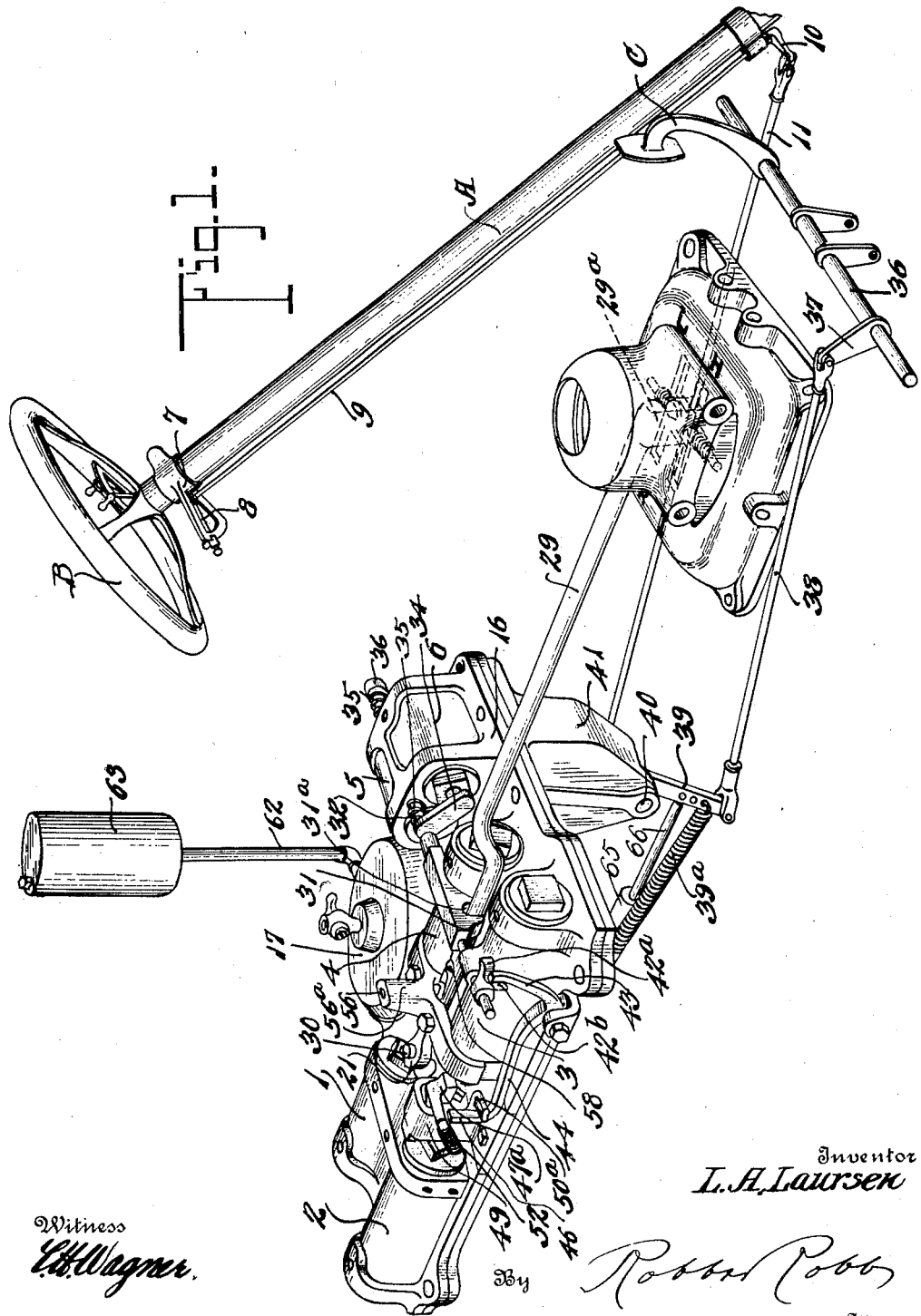
Figure 1 is a perspective view showing a portion of the steering mechanism of a motor vehicle, the upper portion of the transmission case, the clutch lever, and the hydraulic controlling and operating devices by which the gear shifting means for the transmission gearing is operated.

In Fig. 1, A denotes a steering post forming a part of the customary steering mechanism of a motor vehicle, and B the steering wheel adjacent to which are located the customary spark and throttle control devices. On the steering post A I mount the sector 7 adjacent to which is a controller 8 in the form of an arm attached to a rod 9 so as to turn said rod. The rod 9 has an arm 10 at its lower end connected by a universal joint with a rod 11 and the rod 11 is connected to an arm 12 seen in Fig. 5 as affixed to the spindle 13 of the selector valve 14.

Figure 2:
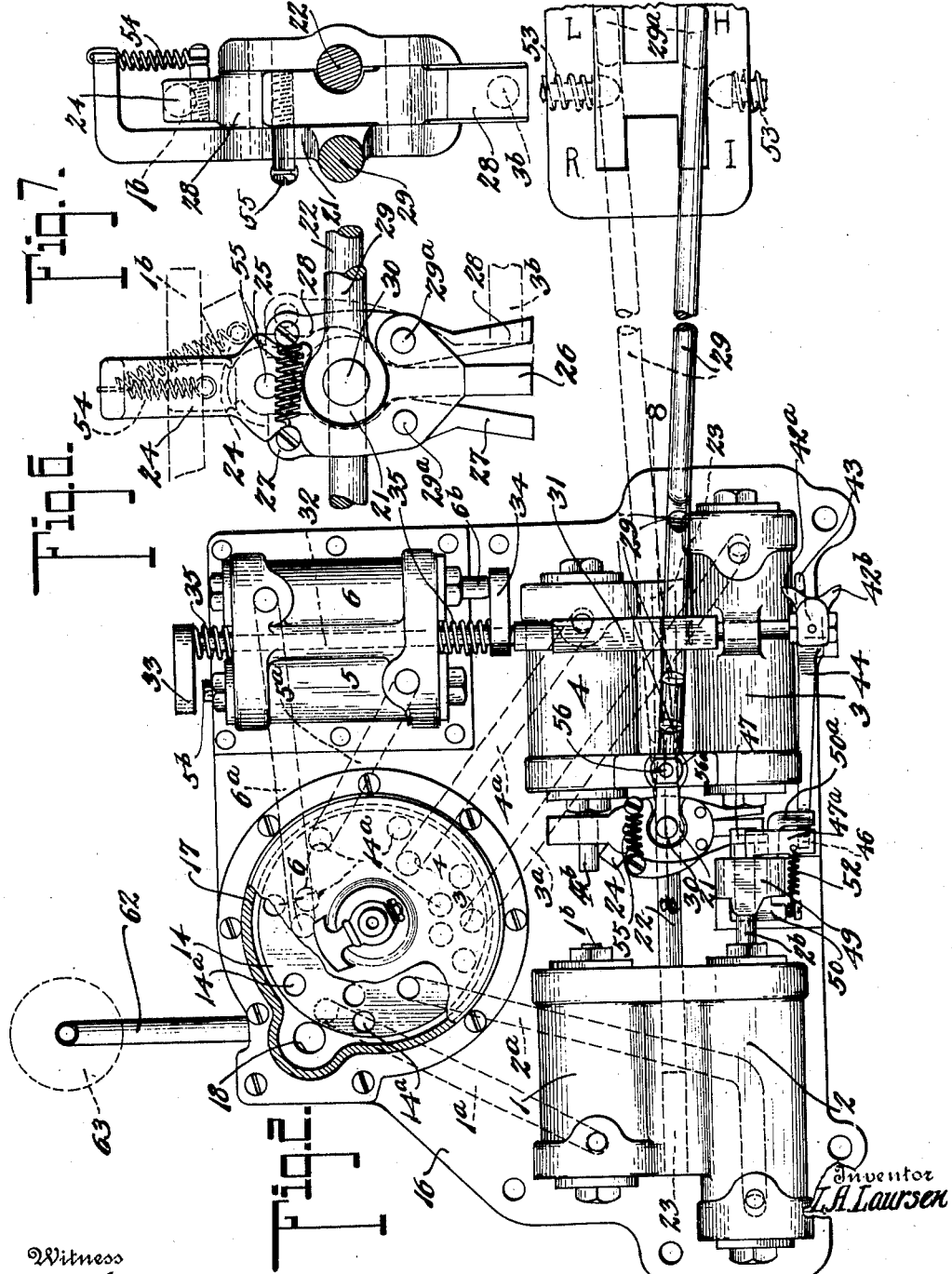
Fig. 2 is a top plan view showing more clearly those devices constituting the invention which directly act upon the gear shifting device or rod, the selector valve casing being shown partly in section.
Figure 4:
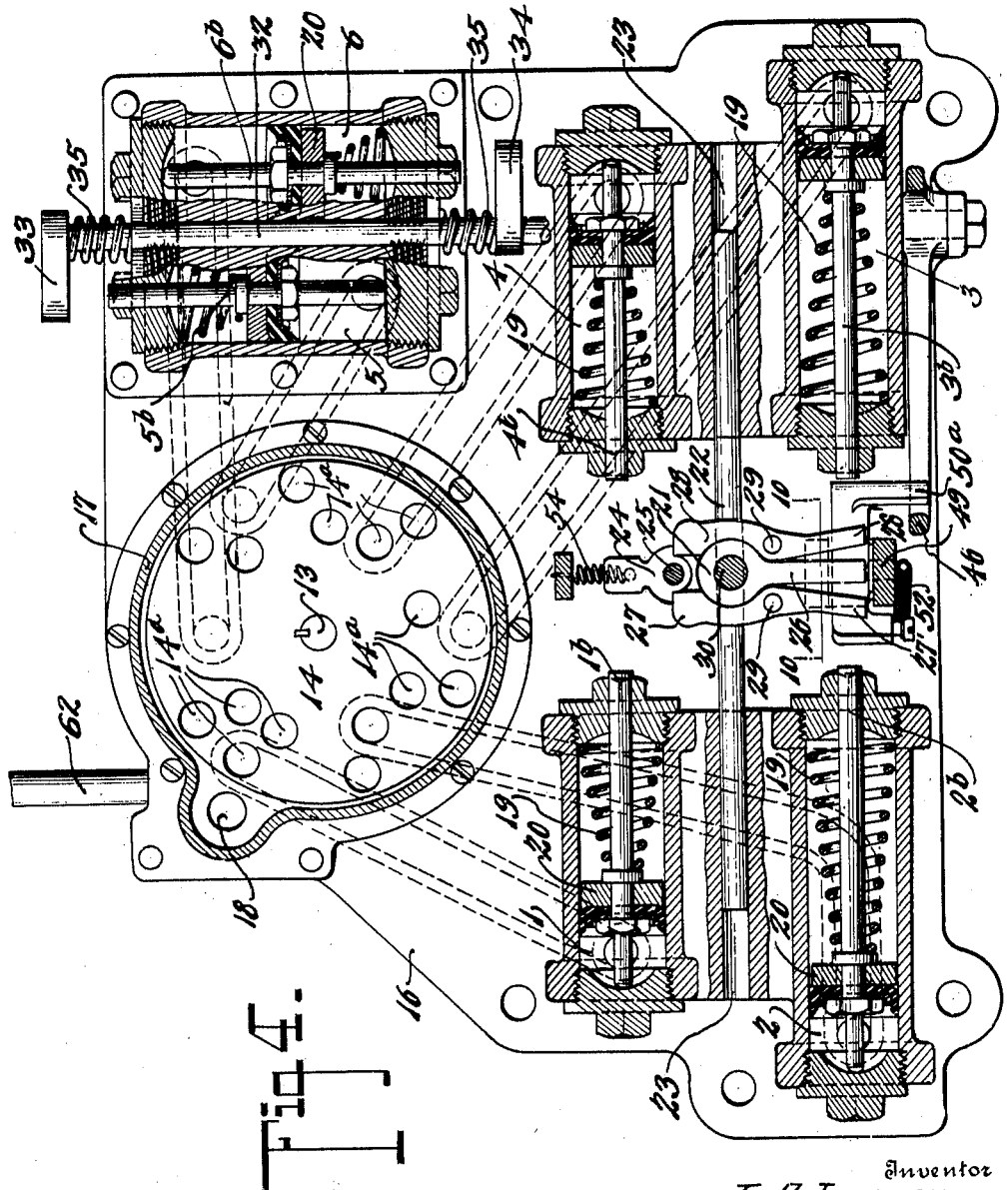
Fig. 4 is a horizontal sectional view taken through the main body of the mechanism, the various cylinders and inclosed parts and the valve casing being shown in section, dotted lines illustrating the conduits connecting the valve casing with said cylinders.

The selector valve 14 controls communication between a motor cylinder 15 located beneath the base 16, and a plurality of selector cylinders designated 1, 2, 3, 4, 5 and 6, seen best in Figs. 2 and 4. A casing 17 incloses the selector valve 14 and a passage 18 leads from the motor cylinder 15 into the casing 17 and is adapted to conduct the pressure medium or motive fluid, preferably oil, to and from the casing 17. The valve 14 is designed to distribute the oil or the pressure medium to the various cylinders 1 to 6 inclusive, for which purpose the valve is provided with a number of openings $14^a$ extending entirely through the valve and so disposed that the valve is susceptible of five different adjustments in each of which adjustments two or three of the openings $14^a$ register with certain of conduits $1^a$, $2^a$, $3^a$, $4^a$, $5^a$ and $6^a$. The conduits just mentioned establish communication between the casing 17 at the under side of the valve 14, and the various cylinders 1 to 6 inclusive, as evident from the drawings.

In the cylinders 1 to 6 inclusive are pistons 20 acted upon by coiled springs 19 whereby said pistons are normally held at one end of their respective cylinders and whereby said pistons if moved away from their normal positions by the pressure of the motive fluid admitted into the adjacent cylinders, are caused to return to the normal positions when the pressure on the motive fluid is discontinued, as will be set forth hereinafter. The various pistons of the cylinders 1 to 6 inclusive are equipped with piston rods respectively designated $1^b$, $2^b$, $3^b$, $4^b$, $5^b$ and $6^b$.

Mounted intermediate cylinders 1 and 2 as an adjacent pair, and the cylinders 3 and 4 as a second adjacent pair, is an actuator 21 comprising a head mounted upon a slide rod 22 the ends of which rod are freely slidable in guide openings 23 formed in the upper casting of which the base 16 forms a part. In other words, the base 16 is preferably made of two castings, a lower one with which the cylinder 15 is formed and an upper one with which the cylinders 1 to 6 inclusive and the valve casing 17 are formed, the two castings being bolted together in an obvious manner.

The actuator 21 is a sort of cross head and comprises an inner arm 24 pivoted at 25 and an upper rigid arm 26. The arm 24 has opposite shoulders adapted to be engaged by latches 27 and 28, which latches are pivoted at $29^a$ as seen best in Figs. 4, 6 and 7. Normally the arm 24 is maintained rigid by the engagement therewith of the latches 27 and 28. If either of said latches is pressed out of engagement respecting the arm 24, said arm is adapted to freely move in the direction of the disengaged latch. For disengaging the latches 27 and 28, said latches are provided with tails 27' and 28' at opposite sides of the rigid arm 26. The arm 24 is in the path of movement of the piston rods $1^b$ and $4^b$ while the other arm 26 of the head or actuator 21 is in the path of movement of the piston rods $2^b$ and $3^b$.

The pistons in the cylinders 1 and 4 are adapted to act upon the actuator or head 21 primarily to carry said head to a neutral position by longitudinal movement of the rod 22 and corresponding movement of the gear shifting rod 29 which is pivoted at its rear end as shown at 30 to the main actuator 21. The piston rods $2^b$ and $3^b$ of the pistons in the cylinders 2 and 3 act upon the device in the cylinders 2 and 3 act upon the device 21 in a manner similar to the pistons $1^b$ and $4^b$ but owing to a greater extent of movement the rods $2^b$ and $3^b$ are capable of carrying the actuator 21 to positions beyond the neutral positions previously spoken of and thereby to cause a gear engaging movement of the actuator 21, having in view its effective connection at 30 with the gear shifting rod 29.

All longitudinal movements of the gear shifting rod 29, which as well known are the gear engaging movements incidental to the operation of ordinary transmission gearing, are effected by the main actuator 21. Lateral movement of the gear shifting rod 29, a movement which is necessary, of course, to set the rod 29 for forward or rearward movement at either extreme of such lateral movement, is obtained by an auxiliary actuator 31, the latter being a slide carried by an end of a slide rod 32 which is mounted in a guide opening intermediate the cylinders 5 and 6. The rod 32 has an outer arm 33 and an inner arm 34 affixed thereto with which arms respectively the piston rods $5^b$ and $6^b$ are adapted to engage in order to impart certain movement to the rod 32 and the auxiliary actuator 31 carried thereby. Coiled springs 35 encircle the rod 32 intermediate the arms 33 and 34 and the adjacent heads of the double cylinder casting, of which the cylinders 5 and 6 form a part, and these springs 35 tend to hold the rod 32 and the actuator 31 normally at an intermediate position relative to its extremes of opposite movements.

It will be apparent from the foregoing that with the main actuator 30 capable of operating the rod 29 longitudinally in opposite directions, and with the auxiliary actuator 31 arranged transversely to the rod 29 and interlocking with said rod at $31^a$, I have provided facilities for imparting to the rod 29 the necessary longitudinal and lateral movements prerequisite to secure the establishment of different gear relations respecting the gears of the transmission mechanism.

I have not illustrated the transmission mechanism in detail as such is immaterial to my invention. My mechanism is adapted in the form here proposed to such transmissions having three speeds forward and one reverse speed, the low and high speeds requiring forward movements of the gear controlling slide and the reverse and intermediate speeds requiring rearward movement of said slide, which is not shown. The direction of such movements is diagrammatically illustrated in the showing of the top plate of the transmission housing as seen in Figs. 1 and 2, and it may be noted that the front end of the gear shifting rod 29 has a suitable member $29^a$, see Fig. 1, attached to the gear actuating slide, not shown, to impart to the latter the required forward, rearward and lateral movements well known as customary for establishing different gear relations to obtain different driving speeds from the engine shaft of a motor vehicle, for instance, to the drive shaft leading to the rear axle installation.

Figure 3:
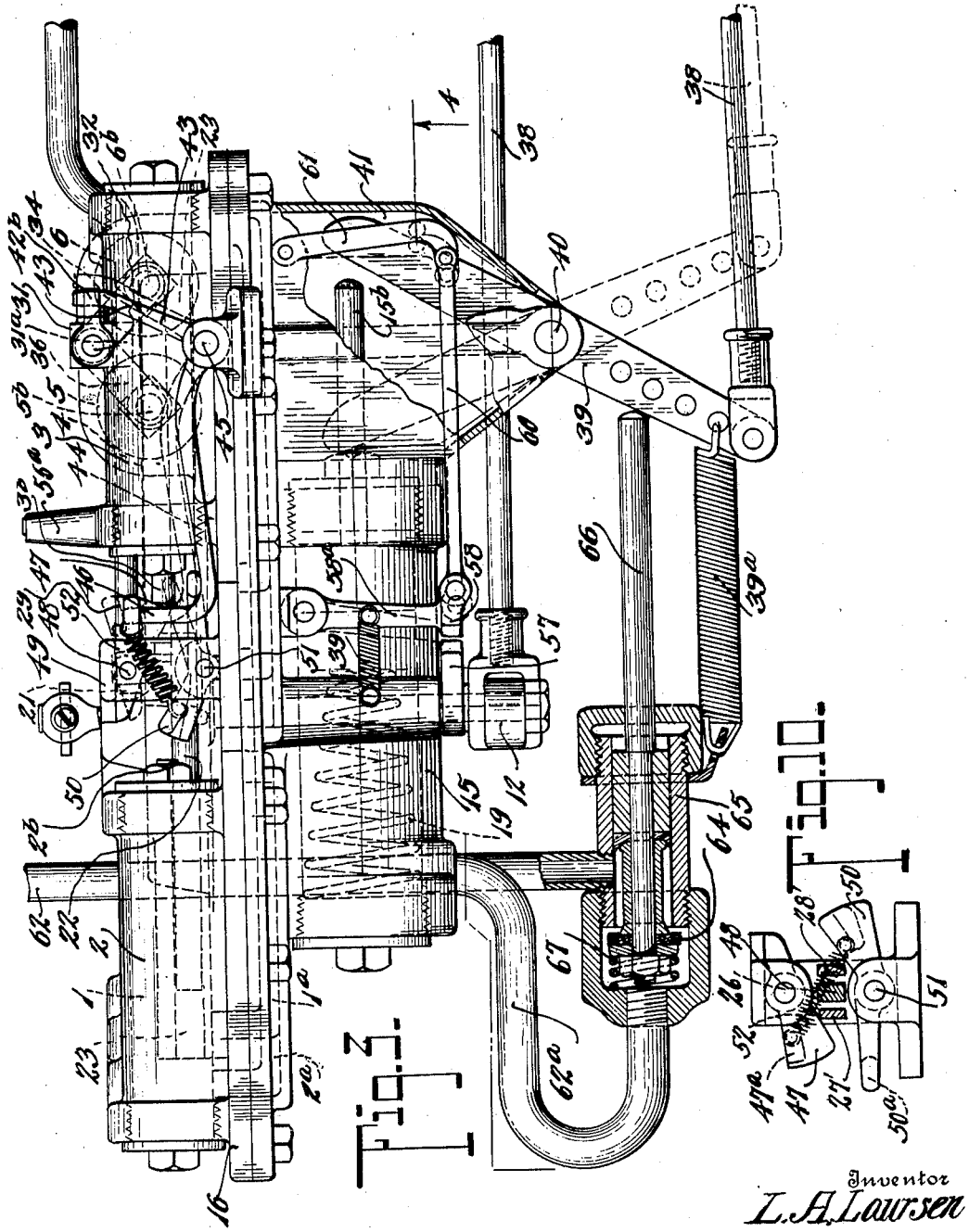
Fig. 3 is a side elevation of the various parts illustrated in Fig. 2, excepting that the front end of the shifting rod is broken away.

Fig. 1 illustrates a clutch lever C, foot operated and adapted to discontinue the driving connection between the engine shaft and axle driving shaft of a motor vehicle, in the customary way. The lever C may be carried by a shaft 36 having an arm 37 connected by a rod 38 with the lever 39. The lever 39, see Fig. 3, is pivoted at 40 and its upper portion extends into a casing 41 at the front end of the cylinder 15. The piston rod $15^b$ of the piston $15^a$, which latter is acted upon by a spring 19, is so disposed that on forward release movement of the clutch lever C the upper end of the lever 39 will engage the piston rod $15^b$ and move the piston $15^a$ rearward in the cylinder 15. The piston and valve inclosing portions of the base 16 are adapted to contain oil the quantity of which is sufficient to fill the cylinder 15, the free space of the valve casing 17 and the passage 18, and passages to cylinders 1 to 6 inclusive. Normally, in fact, the oil, which is the preferred pressure medium used for this invention is contained in the portions 15, 17 and 18 previously described, but is adapted upon rearward movement of the piston $15^a$ actuated by the forward release movement of the clutch lever C, to be forced from the cylinder 15 and casing 17 into selective groups of the cylinders 1 to 6 inclusive, whereby the pistons of the latter cylinders may be properly actuated to effect longitudinal and lateral movements, or longitudinal movements alone, of the gear shifting rod 29. The movements of the rod 29 as just mentioned are those movements required to establish the different gear relations or to render the transmission gearing inactive with the parts thereof at neutral.

The automatic trip mechanism utilized to control the locking of the piston rods $2^b$ and $3^b$ and therefore the pistons thereof, for delayed movement comprises the following instrumentalities: Figs. 1 and 2 show that the outer end of the auxiliary actuator 31 carries spaced tripping lugs $42^a$ and $42^b$ centrally between which is normally disposed the upper end of the vertical arm 43 of the tripping lever 44 pivoted on the base 16 at 45. At its rear portion the lever 44 has a vertical arm 46 disposed beneath the lateral extension $47^a$ of a locking member 47 pivoted at 48 on a somewhat U-shaped bracket 49 disposed between the cylinders 2 and 3. The locking member 47 at the end adjacent to the cylinder 3 is normally disposed in the path of movement of the piston rod $3^b$ and thus locks said rod and its piston against longitudinal movement. A second locking member 50 is disposed beneath the locking member 47, see Figs. 2, 3 and 10, the left hand end of said member 50 as seen in Fig. 3 being disposed in the path of movement of the piston rod $2^b$ to perform a locking function in reference to said rod and its piston. The right hand end of the locking member 50, which member is pivoted at 51 to the bracket 49, is formed with a lateral extension $50^a$ seen best in Fig. 2, which extension overlaps the lever 44. The two locking members 47 and 50 are normally held in their locking positions respecting the piston rods $3^b$ and $2^b$, respectively, by a spring 52 which connects said locking members together.

With the foregoing described construction of parts in mind an understanding of the various actions adapted to be performed by the mechanism will be had on reference to the following description of the particular functioning of the associated devices for establishing different gear relations of a variable speed transmission gearing.

*Shift from neutral to low speed.*—This shift is obtained by moving the control lever 8 from the "N" position on the sector 7 to the "L" position. This sector is equipped with the various speed indications which may be "R" for reverse, "L" for low, "I" for intermediate, "H" for high, and "N" for neutral, and said indications of course facilitate the proper positioning of the lever 8. The resulting action is that the selector valve 14 is moved through the connections 9, 11 and 12 to establish communication between the cylinder 15 through the valve 14, and the conduits $2^a$, $4^a$ and $5^a$ leading to the cylinders 2, 4 and 5, respectively. Forward movement of the lever C releasing the clutch forces the oil from the cylinder 15 into the cylinders 2, 4 and 5 and causes the pistons of these cylinders to move longitudinally against the action of the springs 19 therein.

The piston rod $4^b$ moves outward first as there is no response to such movement because the main actuator 21 is located midway between the cylinders 1 and 4 at the beginning of the operation now being described. Meanwhile the piston rod $5^b$ is acting upon the arm 33 of the rod 32 and therefore on the auxiliary actuator 31, thus moving the latter so as to exert a lateral pull on the rod 29 sufficient to carry said rod laterally to its dotted line position of Fig. 2. In this lateral movement the front end $29^a$ of the rod 29 moves against and overcomes the pressure of a spring actuated plunger 53. At a predetermined point in the movement of the actuator 31 the projection $42^b$ carried thereby impinges the arm 43 of the lever 44, rocks said arm and by so doing simultaneously raises the locking member 47 and lowers the locking member 50. The piston rod $2^b$ which has been locked up to this time, is thus freed and moves forward engaging the latch 27' on the actuator 21. The first effect of this engagement is to release the arm 24 so that said arm will swing leftward as seen in Fig. 4 as the actuator 21 moves to the right toward the cylinders 3 and 4. As soon as the latch 27' abuts with the rigid arm 26 the movement to the right, of the actuator 21, starts and this movement establishes the low speed gear relation, the lateral movement of the arm 24 permitting the piston rod $4^b$ to rock said arm 24 leftward as the head or actuator 21 effects the transition to the low speed relation. A spring 54 normally holds the arm 24 in the position of Fig. 4 or restores it to such position, and a spring 55, see Fig. 6, connects the latches 27 and 28 and normally holds them in locking engagement with the arm 24.

*Shift from low speed to high speed.*—Supposing that the parts are already adjusted for low speed operation of the gearing, shift to high is effected by moving the control lever 8 near the steering wheel B until said lever is opposite the high indication on the adjacent sector 7. When the lever 8 has been moved to its high speed control position through its connections 9, 11 and 12, with the valve 14, the valve is turned in a position to cause openings thereof to register with the points of communication with the casing 17 of the conduits $2^a$, $4^a$ and $6^a$. The clutch lever C is then pressed forward to release the clutch and move the piston $15^a$ of the cylinder 15 whereby to force the oil in said cylinder out through the passage 18, the valve 14 and the conduits $2^a$, $4^a$, and $6^a$, and into the cylinders to which said conduits lead. The result is that the pistons in the cylinders 2, 4 and 6 are acted upon by the pressure of the oil entering said cylinders. The piston rod of the piston $4^b$ is thus caused to move outward engaging the now locked arm 24 and forcing the main actuator to a position midway between the cylinders 1 and 4. The main actuator is thus caused to pull the shifting rod 29 to neutral position. Meanwhile the piston rod 6$^b$ is acting on the arm 34 of the rod 35 and therefore on the auxiliary actuator 31 so that as the rod 29 reaches neutral position the actuator 31 forces the rod across neutral into a position ready to be moved longitudinally. Up to this time the piston rod 2$^b$ has been prevented from movement by its locking member 50. As the auxiliary actuator 31 moves in the manner described, however, the projection 42$^a$ thereof impinges against the arm 43 of the lever 44, and rocks said arm. The locking member 47 is thus lifted, and simultaneously the locking member 50 is depressed until the latter disengages from the piston rod 2$^b$, whereupon the rod 2$^b$ acting under the pressure of its piston moves outward and forwardly, impinges the main actuator through its latch member 27' and said actuator is moved forward under the influence of the piston rod 2$^b$ until the shifting rod 29 has reached a position in which the transition of the gears to high gear relation is established. The impingement of the piston rod 2$^b$ with the tail 27' of the latch 27 unlocks the arm 24 from said latch so that as the actuator 21 goes forward in effecting the high speed gear relation the impingement of the piston rod 4$^b$, already out, with the arm 24, merely rocks the arm leftward into a position opposite that in which it is shown in dotted lines in Fig. 6.

The action of the tripping mechanism as above set forth is merely one by which a delayed movement of the piston rod 2$^b$ is obtainable, by which delayed movement the shift into high from neutral is effected substantially in an automatic manner and without necessitating that the control lever 8 be moved to neutral position and retained there.

*Shift from high speed to low speed.*— The control lever 8 is moved from the high speed indication on the sector 7 to the low speed indication. The valve 14 is thus set so that the pressure medium is led into the cylinders from the piston 15 on the release of the clutch lever 2, 4 and 5. The actuator 21 has been positioned C. practically up against the cylinders 3 and 4. The first effect is for the piston rod 4$^b$ to move out against the arm 24 thus forcing the actuator 21 to the neutral or midway position between the cylinders 1 and 4. At this time piston rod 5$^b$ acts on the arm 33 and shifts the auxiliary actuator 31 to carry the rod 29 over neutral toward the reverse or against the plunger 53 as seen in Fig. 2 until the rod assumes the lateral dotted line extreme of movement depicted in said figure. In this action, of course, the projection 42$^b$ trips the lever 44 in the manner previously set forth and the piston rod 2$^b$ is released. Said piston rod 2$^b$ impinges the latch 27, disengages said latch from the arm 24 and therefore forces the actuator 21 toward the cylinders 3 and 4, the piston rod 4$^b$ rocking the arm 24 leftward and the gear relation being established with the parts arranged substantially as shown in Fig. 2 excepting that it is to be understood that the shifting rod 29 has been carried to its dotted line position.

*Shift from low speed to reverse.*—Control lever 8 is set to the reverse indication on the sector 7. The valve 14 is positioned so that the cylinder 15 is in connection with the cylinders 1, 3 and 5. The piston rod 3$^b$ moves out of its cylinder, engages latch 28 to release the arm 24 from said latch. Thereupon the rod 3$^b$ moves the actuator 21 to the left as seen in Fig. 4 until the piston rod 1$^b$ which has already been moved out of its cylinder, contacts with the arm 24. Since the arm 24 is released from the latch 28 the piston rod 1$^b$ forms no obstacle to the leftward movement of the actuator 21, said rod 1$^b$ simply rocking the arm 24 to the right and assuming the position shown in dotted lines in Fig. 6. Meanwhile the piston rod 5$^b$ has acted on the arm 33 and therefore the auxiliary actuator 31 to hold the shifting rod 29 from being carried laterally into its mid-neutral position under the influence of the plunger 53. Of course the change from low speed to reverse would be accompanied by a stoppage of the vehicle, if the invention is applied to a motor vehicle, effected previously to the shift into reverse.

*Shift from reverse speed to neutral.*—Control lever 8 is set to the neutral position. The valve 14 is thus positioned to connect the cylinder 15 with the cylinders 1 and 4. Subsequent to the transition of the gearing to reverse speed relation all piston rods reenter their cylinders, as will be hereinafter described, so that as the reverse speed is used the arm 24 of the actuator 21 assumes its normal position of Fig. 4, locked by the latches 27 and 28. The release of the clutch therefore, after setting the mechanism to pass from reverse to neutral causes the piston rods 1$^b$ and 4$^b$ to move out of their cylinders. The rod 4$^b$ performs no real action on the actuator 21 but the rod 1$^b$ engages the arm 24 and forces the actuator to its midway position as the pressure medium enters the cylinder 1 under the influence of the operation of releasing the clutch lever C. When the actuator 21 reaches its mid position the gearing is at neutral and the plunger 53 acts to shift the rod 29 to its mid neutral position by which is meant a position intermediate the extremes of its movement relative to the reverse and low gear slot of the transmission case and the intermediate and high gear slot as viewed in Fig. 2.

*Shift from reverse speed to intermediate.—* The actuator 21 is positioned substantially up against cylinders 1 and 2 when at reverse speed adjustment. The control lever 8 is set to intermediate position, correspondingly adjusting the valve 14. Communication is established by the valve between the cylinder 15 and the cylinders 1, 3 and 6. The piston rod 1$^b$ promptly acts upon the arm 24 of the actuator 21 to carry the latter to neutral position. Thereupon the piston rod 6$^b$ through the auxiliary actuator 31 causes lateral movement of the rod 29 across neutral. At this time as an incident to this action the projection 42$^a$ of the actuator 31 rocks the trip lever 44 in the manner previously described, thereby releasing the up to this time locked piston rod 3$^b$ from the locking member 47 and permitting the said rod 3$^b$ to act upon the latch 28 and rigid arm 26 to force the actuator 21 back toward the cylinders 1 and 2, thereby establishing the intermediate gear connection. The movement back toward the cylinders 1 and 2 is not prevented by the forced out piston rod 1$^b$ because the arm 24 has been released from the latch 28 permitting the arm 24 to rock over into the dotted line position of Fig. 2.

*Normal positions of parts after establishing neutral and active gear relations.—* When the piston rods of the various pistons in the cylinders 1 to 6 have functioned to operate the actuators 21 and 31 for establishing the desired gear relations the pressure on the clutch lever C of course may be relieved, permitting said lever to be restored to normal or active position by a spring 39$^a$ connected therewith. This relieves the pressure of the lever 39 on the piston rod 15$^b$ of the piston 15$^a$ and a spring 19 in the cylinder 15 thereupon forces the piston 15$^a$ to its normal forward position as seen in Fig. 3. The above action relieves the oil forced into certain of the various cylinders, of the pressure of the piston 15$^a$ and therefore the springs 19 in the various cylinders are able to restore the pistons of said cylinders to their normal positions at one extreme of their movement, which positions are illustrated in Fig. 4.

The restoration of the pistons and their rods does not disturb the adjustment which has been obtained for the actuator 31 and the established gear relation. In fact, to insure against accidental displacement of the actuator 21 after the gear relation is effected I prefer to employ a detent 56 in the form of a spring-depressed plunger in a small casing 56$^a$ through which the rod 29 passes. This detent plunger is adapted to enter notches 29' at intervals in the length of the rod 29, these notches being at points corresponding with adjustments of the rod 29 when the different gear relations have been effected by movement of said rod.

After the shifting of the gears to a desired relation is obtained in the manner described the clutch controlled by the lever C may be released as often as required, this release being used in practice primarily to temporarily discontinue the drive of the engine to slow down a motor vehicle or to stop it by the brake mechanism, and the gears under such conditions will always remain in the positions established previous to such release movements of the clutch. This is due to the fact that the mere movement of the clutch lever C does not in any way disturb or change the established gear relations by a corresponding movement of the actuator 31 excepting when said release movement of the clutch lever C is preceded by a new adjustment of the control lever 8. True, each time the lever C is moved to release position the tendency of said lever is to force the oil or pressure medium into those of the cylinders 1 to 6 by which the previous gear relation has been obtained, but since said gear relation has already been effected the piston rods of the cylinders might be said to merely idle in such movement, because obviously they do not alter the established adjustment of the actuator 31 and rod 29.

Figure 5:
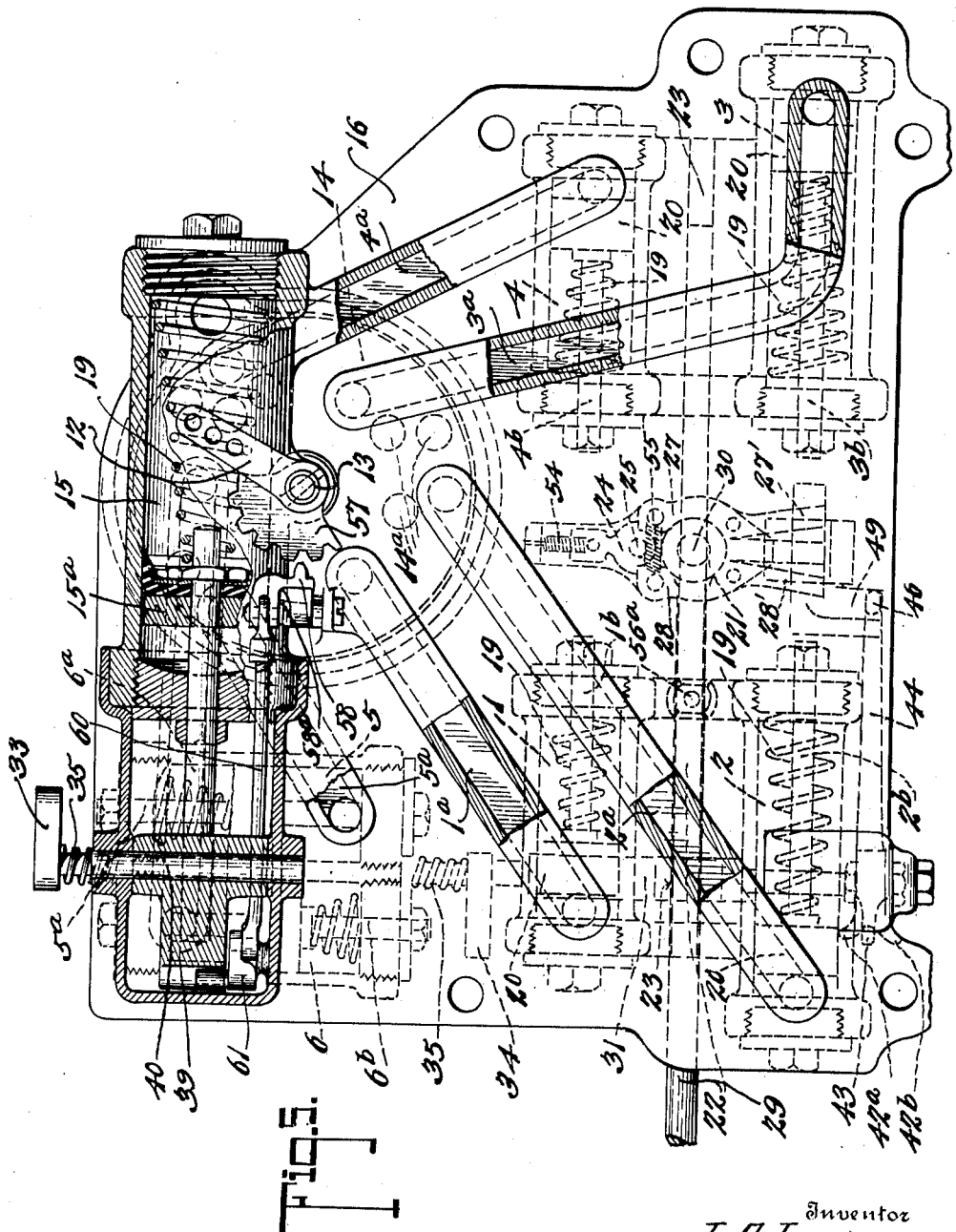
Fig. 5 is an inverted view of the main body portion of the mechanism, the motor cylinder shown in section and certain of the conduits broken away and shown in section.

*Lock for controller.—* As seen best in Fig. 5 the spindle 13 of the valve 14 has fixed thereto a sector 57, the notches corresponding in number to the number of gear relations possible of being established by the use of the mechanism. A locking dog 58 in the form of a lever member is adapted to engage in the notches of the sector 57 to prevent turning of the valve 14 and therefore turning of the controller or lever 8, under certain conditions. The parts 57 and 58 perform two different functions. In the first place they constitute a guide or indexing means to enable a proper positioning of the lever 8 relatively to the sector 7 when installing the invention upon a vehicle or in any other useful relation to a machine. Secondarily, and of greater importance however, the parts 57 and 58 are designed to lock the valve 14 against operation when the clutch lever C is moved to release position. The object of this, of course, is to prevent the possibility, once the controller 8 has been set to obtain a certain established gear relation of the transmission gearing, and the pressure medium started in action to effect such gear relation, that likelihood of a gear relation conflicting with the first one selected, will be established. The locking dog or device 58 is in the form of a lever an upper arm 58$^a$ of which is acted on by a spring 59 tending to hold the dog engaged with the sector 57. Connected with the dog 58, see Fig. 3, is a link 60 attached to a lever 61 disposed in the casing 41 adjacent to the upper end of the lever 39. On release movement of the clutch by forward movement of the lever C the upper end of the lever 39, which is normally so disposed as to bear against the lever 61 and maintain the locking dog 58 inactive, moves rearward from the position seen in Fig. 3. Such movement of the lever 39 relieves the pressure of said lever against the lever 61 and permits the spring 59 to pull the dog 58 into engagement with the sector 57, thereby locking valve 14 against being moved to any new position while the clutch lever C occupies a clutch releasing position. The moment the pressure on the lever C is relieved, obviously the spring 39ª acts through the lever 39 to carry the lever 61 forward and thereby leaves the valve 14 perfectly free to be set at new adjustments, by the action of the controller or lever 8 at the steering wheel B.

Supposing the invention applied to a motor vehicle and the latter is in motion with the high gear relation established, if the car is stopped by pressing down the clutch lever C and applying the brakes, and the high gear relation is retained, the operator may shift to low. To do this he permits the lever C to move partially toward clutch engaging position so that the particular cylinder into which oil has been forced to effect said high gear relation, may become empty by a return of the oil therein, to the cylinder 15. Under such conditions the lever 39 would still bear against the lever 61 and the operator would be able to feel when the clutch was sufficiently adjusted to release the sector 57, by simply pulling on the controller 8 in his effort to carry said controller to the low speed position.

*Replenishment of oil to cylinder 15.—* There is an oil supply pipe 62 leading to the cylinder 15, see Fig. 2, and connected with an oil reservoir 63. A valve 64 is located in a casing 65 to which the pipe 62 is connected and arranged to permit the oil to enter the cylinder 15 but prevent outflow of the oil from the cylinder through the pipe 62. A portion 62ª of the pipe 62 connects the casing 65 with the cylinder 15. If the predetermined minimum of fluid or oil required for the purposes of the invention is reduced the cylinder 15 will lack the amount of the reduced quantity when its piston is at normal, and the pistons in the cylinders 1 to 6 have forced the oil therefrom back to the cylinder 15. The purpose of the valve 64 is to automatically supply oil to the cylinder 15 in the event of diminution of the required amount, and control return of a portion of the fluid to the reservoir 63 if an excess quantity is in said cylinder, and is accomplished in the following manner.

The valve 64 has its rod 66 arranged to operate through one end of the casing 65 and to abut with the lever 39. A spring 67 tends to force the valve toward the lever 39 and thus cut off communication between the reservoir 63 and the cylinder 15. At the normal position of the clutch pedal C the lever 39 engages and moves the rod 66 to adjust the valve for communication between the cylinder 15 and reservoir 63. On actuating the pedal or lever C the pressure of lever 39 against the rod 66 is relieved and the spring 67 causes the valve 64 to cut off communication between the parts 15 and 63.

Having thus described my invention, what I claim as new is:

1. The combination with a gear relation control member, of operating mechanism including separate actuating devices adapted to act separately on said member for causing successive movements thereof in opposite directions, and a manipulative controller one movement of which is adapted to control action of the operating mechanism to effect said movements of said control member.

2. A machine as claimed in claim 1, wherein the operating mechanism also comprises an instrumentality to effect a special movement of the gear relation control member intermediate its opposite movements.

3. The combination with a gear relation control member, of operating mechanism including actuating devices for causing successive longitudinal movements of said member in opposite directions with a separate lateral movement between said opposite movements, and a manipulative controller one movement of which is adapted to control action of the operating mechanism to effect said movements of said control member.

4. A machine as claimed in claim 1, the operating mechanism comprising actuating devices, wherein the successive movements of the control member are longitudinal movements, the action of one actuating device being delayed relatively to another to render the movements successive.

5. The combination with a gear shifter, of actuating devices for moving the shifter to establish different gear relations of gear transmission mechanism, and a control member adjustable by a single movement in one direction to cause operation of the shifter in reverse directions.

6. The combination with a gear relation control member, of operating mechanism including actuating pistons for causing continuous successive movements of said member in opposite directions, and a manipulative controller to set the operating mechanism for action, the operating mechanism including means to cause a pressure medium to act upon the pistons.

7. In combination, a gear shifter, actuating pistons for moving the shifter in opposite directions, a controller to cause a pressure medium to act on the pistons, and means to delay the action of one piston relatively to the other so that one of the opposite movements of the shifter effected by the pistons will succeed the other.

8. In combination, a gear shifter, actuating pistons for moving the shifter in opposite directions, a controller to cause a pressure medium to act on the piston, means to delay the action of one piston relatively to the other so that one of the opposite movements of the shifter effected by the pistons will succeed the other, and an actuating piston for imparting a separate movement of the shifter at a time between the times when the first mentioned pistons act upon the shifter.

9. In combination, a gear shifter, actuating pistons for moving the shifter in opposite directions, a controller to cause a pressure medium to act on the piston, means to delay the action of one piston relatively to the other so that one of the opposite movements of the shifter effected by the pistons will succeed the other, other actuating pistons for moving the shifter in opposite directions different from those in which the first mentioned pistons move said shifter, and means whereby the second mentioned pistons are caused to act upon the shifter at a time between the times of the opposite movements of the shifter effected by the first mentioned pistons.

10. In combination, a gear shifter, actuating pistons for moving the shifter in opposite directions, a controller to cause a pressure medium to act on the piston, means to delay the action of one piston relatively to the other so that one of the opposite movements of the shifter effected by the piston will succeed the other, other actuating pistons for moving the shifter in opposite directions different from those in which the first mentioned pistons move said shifter, and means whereby the second mentioned pistons are caused to act upon the shifter at a time between the times of the opposite movements of the shifter effected by the first mentioned pistons, the controller aforesaid also coöperating to cause a pressure medium to act upon the second mentioned pistons.

11. In combination a gear shifter, piston mechanism for moving the shifter longitudinally in opposite directions, means to time the action of said piston mechanism so that its said opposite movements take place successively, and means for supplying a pressure medium to act upon the piston mechanism.

12. In combination a gear shifter, piston mechanism for moving the shifter longitudinally in opposite directions, means to time the action of said piston mechanism so that its said opposite movements take place successively, separate piston mechanism for causing additional movement of the shifter and timed to act on the latter between the successive opposite movements of the shifter effected by the first piston mechanism, and a controller for supplying a pressure medium to act upon both piston mechanisms.

13. In combination, a gear relation control member, actuating means therefor comprising a piston mechanism adapted to act on said member to move the same in opposite directions longitudinally thereof, means whereby said piston mechanism effects the opposite movements of the said member in a successive manner, instrumentalities for causing a transverse movement of said member at a time between the successive opposite movements thereof, and means controlling the supply of a pressure medium to act upon the piston mechanism aforesaid.

14. In combination, a gear relation control member, actuating means therefor comprising a piston mechanism adapted to act on said member to move the same in opposite directions longitudinally thereof, means whereby said piston mechanism effects the opposite movements of the said member in a successive manner, a second piston mechanism coöperative with the said member to move the same transversely at a time between the successive longitudinal movements of said member effected by the first mentioned piston mechanism, the second piston mechanism including devices to move the gear relation control member in either of opposite directions transversely to its longitudinal movement.

15. In combination, a gear relation control member, piston mechanism for moving said member in opposite directions, other mechanism for moving said member in a direction different from those in which the piston mechanism actuates said member, and instrumentalities intermediate the last mentioned mechanism and said piston mechanism whereby the piston mechanism is controlled so that the opposite movements imparted thereby to the gear relation control member succeed one another.

16. In combination, a gear relation control member, means to move the said member in opposite directions, other means to move said member in a direction different from its movements by the first mentioned moving means, and instrumentalities controlled by the second mentioned moving means whereby to cause the first mentioned moving means to act so as to impart in a successive manner said opposite movements to the gear relation control member.

17. In combination, a gear shifter, a piston mechanism coöperative with said shifter to move the same longitudinally in opposite directions, a second piston mechanism coöperative with said shifter to move the same transversely in opposite directions, means intermediate said piston mechanism whereby the opposite movements imparted by one of said mechanisms to the gear shifter are rendered successive, and means controlling the action of a pressure medium upon the piston mechanisms.

18. In combination, a gear shifter, a piston mechanism coöperative with the shifter to move the same longitudinally in opposite directions, a second piston mechanism coöperative with said shifter to move the same transversely in opposite directions, trip mechanism operable by said second piston mechanism to cause the first piston mechanism to effect the opposite longitudinal movements of the gear shifter in a successive manner, means whereby the second piston mechanism is adapted to act on the shifter at a time between the times of the opposite longitudinal movements of said shifter, and means for supplying a pressure medium to act upon the respective piston mechanisms.

19. In combination, a gear shifter, piston mechanism connected therewith to move the same longitudinally in reverse directions, lock mechanism associated with said piston mechanism whereby the reverse movements of the shifter may be caused to take place successively, and means to trip said lock mechanism at the end of movement of the shifter in one direction by the piston mechanism whereby said piston mechanism may operate upon the shifter to cause movement of the same in a reverse direction.

20. In combination, a gear shifter, piston mechanism adapted to move said shifter in opposite directions longitudinally, locking means for said piston mechanism whereby opposite movements of the shifter by said piston mechanism are caused to succeed one another, other piston mechanism arranged to act upon the shifter to move the same transversely at a time between the successive longitudinal movements effected by the first piston mechanism, trip devices intermediate said second piston mechanism and the locking devices for the first piston mechanism to trip the latter and thereby control the timing of said successive movements, and means to supply a pressure medium to act on both piston mechanisms.

21. In combination, a gear shifter, piston mechanism adapted to move said shifter in opposite directions longitudinally, locking means for said piston mechanism whereby opposite movements of the shifter by said piston mechanism are caused to succeed one another, a second piston mechanism arranged to act upon the shifter to move the same transversely in opposite directions, a trip device for said locking means, and instrumentalities operable by said second piston mechanism to actuate said trip device when the shifter is moved in either direction transversely by the said second piston mechanism, and means for supplying a pressure medium to act upon both piston mechanisms.

22. In combination, a gear shifter, a main actuator for moving said shifter longitudinally in opposite directions, a piston mechanism comprising pistons arranged to engage said actuator and shift it in opposite directions, an auxiliary actuator connected with said shifter to move it in opposite directions transverse to its movement by the first actuator, a piston mechanism comprising pistons coöperative with the auxiliary actuator to impart opposite movements thereto, locking means for pistons of the first piston mechanism adapted to delay the action of one piston relatively to another so that opposite movements imparted thereby to the actuator will be successive, trip mechanism for releasing said locking means, and devices carried by said auxiliary actuator for actuating said trip mechanism.

23. In combination, a gear shifter, a main actuator therefor, a piston mechanism comprising pistons at opposite sides of said actuator adapted to actuate the same and move the shifter longitudinally in opposite directions, locking devices for preventing movement of said pistons, an auxiliary actuator connected with the shifter to move the same transversely in opposite directions, pistons arranged to move said auxiliary actuator in opposite directions, and automatic means intermediate the auxiliary actuator and the locking devices for the pistons coöperative with the main actuator to release said locking devices so as to insure coöperation of said pistons with the main actuator at different times.

24. In combination, a gear shifter, piston mechanism controlling longitudinal opposite movements of said shifter and including a main actuator connected therewith, opposing pistons at opposite sides of said actuator coöperative therewith and having piston rods coöperative with the actuator to cause gear engaging actions of the shifter, other opposing pistons at opposite sides of said main actuator having piston rods coöperative therewith to move the shifter to a neutral position, said actuator embodying a movable arm with which the last mentioned pistons coact, latches coacting with said movable arm to maintain the latter rigid when engaged by the coöperative piston rods under certain conditions, and to release and permit yielding of said arm when engaged by its coöperative pistons under other conditions, the first mentioned opposing pistons being arranged to actuate said latches as well as the main actuator, locking means cooperative with said first mentioned opposing pistons whereby to delay the action of the piston rods thereof on the main actuator, means to trip said locking means at a predetermined time, and means to supply a pressure medium to act upon said various pistons.

25. In combination, a gear shifter, piston mechanism controlling longitudinal opposite movements of said shifter and including a main actuator connected therewith, opposing pistons at opposite sides of said actuator coöperative therewith and having piston rods coöperative with the actuator to cause gear engaging actions of the shifter, other opposing pistons at opposite sides of said main actuator having piston rods coöperative therewith to move the shifter to a neutral position, said actuator embodying a movable arm with which the last mentioned pistons coact, latches coacting with said movable arm to maintain the latter rigid when engaged by the coöperative piston rods under certain conditions, and to release and permit yielding of said arm when engaged by its coöperative pistons under other conditions, the first mentioned opposing pistons being arranged to actuate said latches as well as the main actuator, locking means coöperative with said first mentioned opposing pistons whereby to delay the action of the piston rods thereof on the main actuator, a piston mechanism separate from the pistons above referred to and coöperative with the shifter to move the same transversely, an auxiliary actuator intermediate the last mentioned piston mechanism and the shifter, and devices carried by the auxiliary actuator for tripping the locking means aforesaid to release the latter from the pistons upon which the locking means acts.

26. In mechanism of the class described, the combination of a shifting member operable to establish different gear relations, pressure operated devices coacting with said shifting member to move the same longitudinally, and means for controlling the action of the pressure medium upon said pressure operated devices to cause movement of the shifting member carrying same in reverse directions, with a lateral movement between the movements in reverse directions, whereby gear unshipping, neutralizing, and gear engaging actions of the shifting member are obtainable at a single continuous operation.

27. In mechanism of the class described, the combination of a shifting member operable to establish different gear relations, pressure operated devices coacting with said shifting member to move the same to effect at a single continuous operation gear unshipping, neutralizing, and gear engaging actions, the last action involving movement of the shifting member in a direction reverse to the unshipping action, and operating means for the pressure operated devices including a controlling selector member movement of which in one direction will cause the three actions aforesaid.

28. In combination, a gear relation control member, selecting mechanism for operating this member including pressure operated devices, a manual controller operable to predetermine the actions of the pressure operated devices on the control member in effecting transition from one gear relation to another, an instrumentality to cause a pressure medium to actuate the pressure operated devices, and locking means for the manual controller operable by said instrumentality.

29. In combination, a gear relation control member, selecting mechanism for operating this member including pressure operated devices, a manual controller operable to predetermine the actions of the pressure operated devices on the control member in effecting transition from one gear relation to another, an instrumentality to cause a pressure medium to actuate the pressure operated devices, and locking means for the manual controller effective incident to operation of said instrumentality to cause actuation of the pressure operated devices.

30. In combination, a gear relation control member, selecting mechanism for operating this member including pressure operated devices, a manual controller operable to predetermine the actions of the pressure operated devices on the control member in effecting transition from one gear relation to another, a clutch lever operable by clutch release movement to cause a pressure medium to act upon the pressure operated devices, and a locking dog for holding said manual controller against movement and operable to become effective upon release movement of the clutch lever.

31. In combination, a gear relation control member, selecting mechanism for operating this member including pressure operated devices, a manual controller operable to predetermine the actions of the pressure operated devices on the control member in effecting transition from one gear relation to another, a clutch lever operable by clutch release movement to cause a pressure medium to act upon the pressure operated devices, and a locking dog for holding said manual controller against movement and operable to become effective upon release movement of the clutch lever, the manual controller including a valve controlling the action of the pressure medium on the pressure operated devices.

32. In combination, a gear relation control member, selecting mechanism for operating this member including pressure operated devices, a manual controller operable to predetermine the actions of the pressure operated devices on the control member in effecting transition from one gear relation to another, a clutch lever operable by clutch release movement to cause a pressure medium to act upon the pressure operated devices, and a locking dog for holding said manual controller against movement and operable to become effective upon release movement of the clutch lever, the manual controller including a valve controlling the action of the pressure medium on the pressure operated devices and having a notched sector adapted to be interlockingly engaged by said locking dog.

In testimony whereof I affix my signature.

LAURITS A. LAURSEN.